(12) United States Patent  (10) Patent No.: US 8,573,155 B2
Arvidsson  (45) Date of Patent: Nov. 5, 2013

(54) MILKING SYSTEM

(75) Inventor: Desiree Arvidsson, Skallinge (SE)

(73) Assignee: DeLaval Holding AB, Tumba (SE)

( * ) Notice: Subject to any disclaimer, the term of this patent is extended or adjusted under 35 U.S.C. 154(b) by 183 days.

(21) Appl. No.: 13/258,042

(22) PCT Filed: Mar. 31, 2010

(86) PCT No.: PCT/EP2010/054365
§ 371 (c)(1),
(2), (4) Date: Sep. 21, 2011

(87) PCT Pub. No.: WO2010/115826
PCT Pub. Date: Oct. 14, 2010

(65) Prior Publication Data
US 2012/0012059 A1  Jan. 19, 2012

(30) Foreign Application Priority Data
Apr. 9, 2009 (SE) ...................... 0950234

(51) Int. Cl.
A01J 5/007 (2006.01)
(52) U.S. Cl.
USPC .................... 119/14.08; 119/14.18
(58) Field of Classification Search
USPC .......... 119/14.08, 14.01, 14.02, 14.14, 14.18; 324/71.4; 700/275
See application file for complete search history.

(56) References Cited

U.S. PATENT DOCUMENTS

| 5,416,417 A | 5/1995 | Peles |
| 5,771,837 A | 6/1998 | Van Der Lely |
| 6,394,028 B1 * | 5/2002 | Birk .......................... 119/14.08 |
| 6,748,251 B2 * | 6/2004 | Tsenkova et al. ............. 600/310 |
| 7,114,458 B2 * | 10/2006 | Sundborger ................ 119/14.02 |
| 7,836,848 B2 * | 11/2010 | Van Den Berg et al. ... 119/14.02 |
| 8,256,376 B2 * | 9/2012 | Borsen ........................ 119/14.02 |
| 2004/0154548 A1 * | 8/2004 | Eriksson .................... 119/14.08 |
| 2004/0168643 A1 * | 9/2004 | Nilsson ...................... 119/14.02 |

(Continued)

FOREIGN PATENT DOCUMENTS

EP  1 070 452 A2  1/2001
EP  1 126 757 B1  11/2002

(Continued)

OTHER PUBLICATIONS

International-Type Search Report, dated Sep. 25, 2009, from corresponding PCT application.

(Continued)

*Primary Examiner* — T. Nguyen
(74) *Attorney, Agent, or Firm* — Young & Thompson

(57) ABSTRACT

An identification arrangement identifies animals, and only when a milk permission criteria is fulfilled is that animal provided with access to the milking machine. The milking machine extracts milk from the animal. In connection with the milking, a cell counter unit determines a quality parameter reflecting a somatic cell count for the milk extracted from the animal. The cell counter unit includes a sampling unit for taking samples from the extracted milk and a counter unit, which determines the quality parameter by registering a true number of somatic cells per unit volume in said samples. A control unit receives the quality parameter and in response thereto assigns a milk permission interval determining an earliest point after a completed milking at which point the set of milk permission criteria for the animal are again enabled to be fulfilled.

19 Claims, 3 Drawing Sheets

(56) References Cited

U.S. PATENT DOCUMENTS

| | | | |
|---|---|---|---|
| 2005/0126498 A1* | 6/2005 | Bosma | 119/14.02 |
| 2006/0037542 A1* | 2/2006 | Denes et al. | 119/14.47 |
| 2006/0107899 A1* | 5/2006 | Johannesson et al. | 119/14.18 |
| 2006/0124064 A1* | 6/2006 | Fullam et al. | 119/14.02 |
| 2006/0249082 A1* | 11/2006 | Holmertz et al. | 119/14.02 |
| 2008/0000426 A1* | 1/2008 | Grabek et al. | 119/14.14 |
| 2009/0201159 A1* | 8/2009 | Kaever et al. | 340/573.1 |
| 2010/0263595 A1* | 10/2010 | Francke | 119/14.08 |
| 2010/0282172 A1* | 11/2010 | Eriksson et al. | 119/14.02 |
| 2011/0051547 A1* | 3/2011 | Gudmundsson et al. | 366/140 |
| 2013/0025540 A1* | 1/2013 | Axelson | 119/14.02 |
| 2013/0025541 A1* | 1/2013 | Axelson | 119/14.02 |
| 2013/0087468 A1* | 4/2013 | Hoey | 205/792 |

FOREIGN PATENT DOCUMENTS

| | | | |
|---|---|---|---|
| EP | 1 264 536 A1 | 12/2002 | |
| EP | 1 917 850 A1 | 5/2008 | |
| RU | 2 054 247 C1 | 2/1996 | |
| RU | 2 210 886 C2 | 8/2003 | |
| SU | 1402304 A1 | 6/1988 | |
| SU | 1764587 A1 | 9/1992 | |
| WO | 00/27183 A1 | 5/2000 | |
| WO | 01/93666 A1 | 12/2001 | |
| WO | 2008/060235 A1 | 5/2008 | |
| WO | 2008/121050 A1 | 10/2008 | |

OTHER PUBLICATIONS

International Search Report, dated Mar. 9, 2011, from corresponding PCT application.

Supplementary International Search Report, dated Jul. 28, 2011, from corresponding PCT application.

\* cited by examiner

MILKING SYSTEM

THE BACKGROUND OF THE INVENTION AND PRIOR ART

The present invention relates generally to automatic milking systems. The invention also relates to a computer program and a computer readable medium.

Automatic milking solutions are becoming increasingly efficient and sophisticated. Today, there is also a strong demand for flexible and animal-friendly milk production. For example, so-called milking robots have been introduced, which enable animals to autonomously decide when they are to be milked. Milking robots are advantageous because they render it possible to service a relatively large number of milking animals via comparatively few milking machines. Milking robots are also desirable from an animal health point-of-view, since thereby it is uncomplicated to extract milk more frequently than by applying the existing alternative solutions, and in general, high-frequency milking vouches for a good udder health.

Various solutions are known for investigating the milk quality, and based thereon, deducing a health condition for the milking animal. For example U.S. Pat. No. 5,416,417 reveals a method and system for investigating mastitis of a cow by measuring the electrical conductivity of the milk extracted from the cow. An average value of the electrical conductivity is computed for a particular historic interval, and once each day any deviation between the electrical conductivity and the average thereof is determined. The deviation is stored and/or displayed and serves as an indication of the onset of mastitis.

EP 1 126 757 discloses a solution for regulating the handling of milk during the milking process, wherein at least one property of a particle present in the milk is assessed, e.g. the number of somatic cells. The purpose of this assessment is to provide a basis for substantially real-time regulation, or adjustment, of the milking process and/or the transport of milk during milking.

EP 1 070 452 describes a method for automatically milking animals, wherein various criteria are proposed for determining an appropriate time between consecutive milkings of a given animal. Inter alia, a recorded somatic cell count for the animal is presented as one such criterion. If the somatic cell count appears to signal a latent mastitis, the animal should be milked at relatively shorter intervals. It is here presumed that the somatic cell count is determined off-line at a remote location (e.g. in a laboratory).

Hence, the prior art includes a solution for real-time assessment of the volume concentration of somatic cells in milk aiming at controlling an ongoing process, i.e. milk extraction and/or milk transport. The prior art also shows that it is advisable to milk an animal having a high recorded somatic cell count at relatively shorter intervals. Today, many national/regional dairy associations provide farmers with test reports on a monthly basis. Inter alia, the reports reflect the concentration of somatic cells in the milk for each of the farmer's animals. Recent studies, however, have found that the somatic cell count may vary quickly, and thus attain highly dissimilar values at different milkings. Therefore, a recorded somatic cell count, which perhaps is updated monthly, may not provide an adequate basis for assigning an appropriate delay until the next milking of a given animal.

SUMMARY OF THE INVENTION

The object of the present invention is to alleviate the above problem, and thus offer an improved solution for performing automatic milking of animals at intervals that are most favorable from an overall perspective.

According to one aspect of the invention, the object is achieved by the initially described milking system, wherein the cell counter unit includes a sampling means and a counter means. The sampling means is configured to take samples from the extracted milk, and the counter means is configured to determine the quality parameter by registering a true number of somatic cells per unit volume in the samples.

This system is advantageous because, based on the quality parameter; the control unit can set the milk permission interval to a subsequent milking to a suitable value essentially without delay.

According to one preferred embodiment of this aspect of the invention, the cell counter unit is configured to determine the quality parameter in connection with completing the milking of an animal via the milking machine. Thereby, it is guaranteed that the milk permission interval is assigned sufficiently early.

According to another preferred embodiment of this aspect of the invention, the control unit is configured to store the received quality parameters. Based on the stored quality parameters, the control unit is configured to derive a respective historic development of the quality parameters for animals milked repeatedly by the milking machine. Further, the control unit is configured to assign the milk permission interval for an animal based on the historic development for that animal, such that the milk permission interval is shortened if said development fulfils an increase criterion regarding the number of somatic cells per unit volume; and the milk permission interval is prolonged if said development fulfils a decrease criterion regarding the number of somatic cells per unit volume. Consequently, appropriate milk permission intervals can be set for each animal.

According to yet another preferred embodiment of this aspect of the invention, the control unit is configured to determine a respective interval between consecutive milkings of animals returning to the milking machine. The control unit is then configured to assign the milk permission interval based on an actual interval between a latest milking and the milking prior to that milking. Specifically, the milk permission interval is assigned such that the decrease criterion is mitigated relative to a nominal assumption if the actual interval is longer than a current milk permission interval; and the decrease criterion is unchanged relative to the nominal assumption if the actual interval is equal to the current milk permission interval. In other words, if the animal waits longer than what is specified by the milk permission interval before returning to the milking machine to be milked, this is weighed into the decrease criterion, for example such that, if so, a somewhat higher somatic cell count per volume unit is accepted before decreasing the milk permission interval.

According to still other preferred embodiments of this aspect of the invention, the control unit is configured to assign the milk permission interval based on a current lactation cycle for the animal in question. This means that the decrease criterion is sharpened relative to a nominal assumption if the number of days in milk is below a first threshold value. Alternatively, or as a complement thereto, the decrease criterion is sharpened relative to the nominal assumption if the number of days in milk is above a second threshold value. Namely, thereby the system can be more responsive to shortening the milk permission interval in the more sensitive periods of the lactation cycle, i.e. in the beginning and/or the end thereof.

According to further preferred embodiments of this aspect of the invention, the control unit is configured to assign the milk permission interval based on a number of lactation cycles completed by the animal in question. This means that the decrease criterion is relatively strict if the animal has completed a number of lactation cycles below a first threshold number. Alternatively, or as a complement thereto, the decrease criterion is relatively mild if the animal has completed a number of lactation cycles equal to or above the first threshold number. Hence, the system can be more responsive to shortening the milk permission interval for an animal that experiences its first or second lactation cycle, and somewhat less responsive to an animal that has completed more lactation cycles. Generally, this is a beneficial strategy from an udder health point-of-view.

According to another preferred embodiment of this aspect of the invention, the system includes a milk tank configured to store milk extracted from a plurality of animals. Further, the control unit is configured to assign the milk permission interval for an animal based on (i) a total somatic cell count for an amount of milk currently stored in the milk tank and (ii) a quality parameter for the milk extracted from said animal. The control unit assigns the milk permission interval such that a future milk permission interval is allowed to be identical to a currently assigned milk permission interval, if the milk extracted from said animal is not expected to cause the total somatic cell count in the milk tank to exceed a predetermined level. However, a future milk permission interval is shortened relative to a currently assigned milk permission interval, if the milk extracted from said animal is expected to cause the total somatic cell count in the milk tank to exceed the predetermined level. Thereby, the milk quality in the tank can be kept above a certain level.

According to yet another preferred embodiment of this aspect of the invention, prior to assigning a shortened milk permission interval, the control unit is configured to investigate whether or not a servicing capacity of the milking machine is estimated to be sufficient to handle an increased milking demand resulting from the thus shortened milk permission interval. The control unit only assigns the shortened milk permission interval if the servicing capacity of the milking machine is estimated to be capable of handling the increased milking demand. Consequently, it is guaranteed that all animals can be milked according to their assigned milk permission criteria.

According to still another preferred embodiment of this aspect of the invention, the cell counter unit includes optical detector means configured to register the true number of somatic cells in a cavity having a well-defined volume. Hence, the true number of somatic cells per unit volume can be determined with high accuracy.

According to an additional preferred embodiment of this aspect of the invention, the control unit is configured to assign the milk permission interval for an animal, such that the milk quality parameter at a given future milking of said animal is expected to attain a value within a predefined interval. As a result, high milk quality is attainable in a very straightforward manner.

According to another preferred embodiment of this aspect of the invention, the system includes a milking robot configured to automatically attach teat cups to an animal that is present within an operation area of the milking machine. Thus, the milking process can be made fully automatic.

According to a further aspect of the invention, the object is achieved by a computer program, loadable into the memory of a computer. The program comprises software, which when run on the computer is configured to perform the following steps: identify an animal; provide access for the animal to the milking machine only if a set of milk permission criteria are fulfilled for the animal; control the milking machine to automatically extract milk from a milking animal present at the milking machine; control a cell counter unit to take at least one sample from the milk that is extracted from the animal; determine a milk quality parameter by registering a true number of somatic cells per unit volume in said at least one sample; and in response to the quality parameter, and assign a milk permission interval determining an earliest point in time after a completed milking at which point in time the set of milk permission criteria for the animal are again enabled to be fulfilled.

According to yet another aspect of the invention, the object is achieved by a computer readable medium, having a program recorded thereon, where the program is to control a computer to execute the above steps.

The advantages of the above-mentioned computer program and computer readable medium are apparent from the discussion hereinabove with reference to the proposed system.

Further advantages, advantageous features and applications of the present invention will be apparent from the following description and the dependent claims.

BRIEF DESCRIPTION OF THE DRAWINGS

The invention is now to be explained more closely by means of preferred embodiments, which are disclosed as examples, and with reference to the attached drawings.

DESCRIPTION OF PREFERRED
EMBODIMENTS OF THE INVENTION

Figure 1:
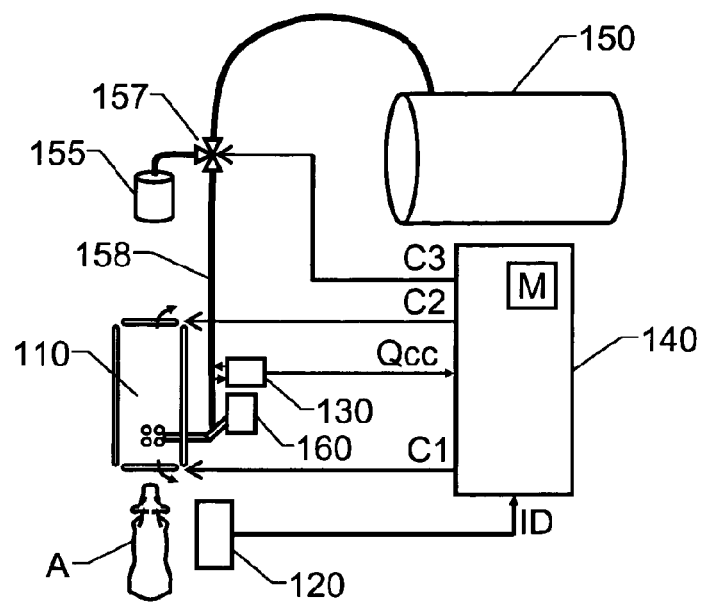
FIG. 1 shows an overview of a milking system according to one embodiment of the invention.

We refer initially to FIG. 1, which schematically shows an overview of a milking system according to one embodiment of the invention. The milking system includes a milking machine 110, an identification arrangement 120, a cell counter unit 130 and a control unit 140.

The identification arrangement 120 is configured to identify an animal A approaching the milking machine 110. Of course, many alternative identification arrangements are conceivable according to the invention. For example the animal A may be identified at a gate means before reaching the milking machine 110, or the animal A may be identified when already present at milking machine 110. In any case, the animal A is only milked by the milking machine 110 if a set of milk permission criteria are fulfilled for that animal A. For example, this can be effected by the identification arrangement 120 forwarding identification data ID for the animal A to the control unit 140, the control unit 140 checking the set of milk permission criteria, and if these are fulfilled, the control unit 140 generates a first control signal C1, which causes a first gate to the milking machine 110 to open.

Once the animal A is present within an operation area of the milking machine 110, the machine is controlled to automatically extract milk from the animal A. The cell counter unit 130 is configured to determine a quality parameter $Q_{cc}$, which reflects a somatic cell concentration for the milk extracted from said animal A (i.e. a number of cells per unit volume, or a weight of the somatic cells relative to a total milk weight).

Specifically, here, the cell counter unit 130 takes samples from the extracted milk and registers a true number of somatic cells per unit volume therein. After completed milking a second control signal C2 from the control unit 140 preferably causes a second gate to the milking machine 110 to open, such that the animal A can exit from the operation area of the milking machine 110.

Figure 2:
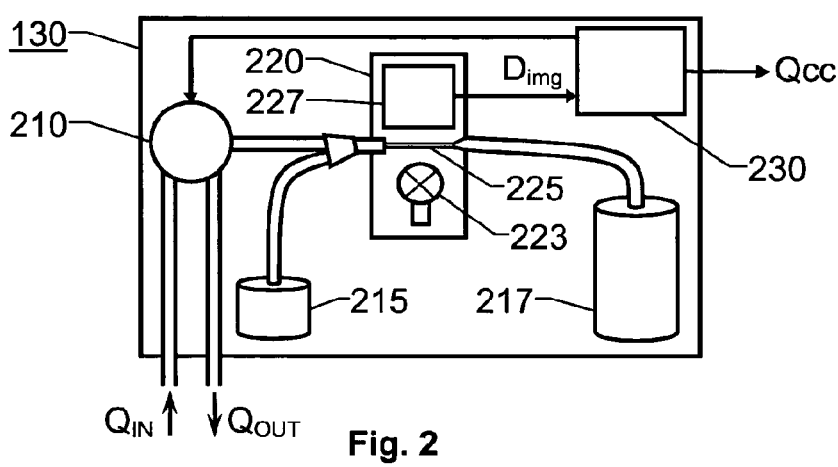
FIG. 2 schematically shows a cell counter unit according to one embodiment of the invention.

FIG. 2 shows a cell counter unit 130 according to one embodiment of the invention. In FIG. 2, we see that the cell counter unit 130 includes a sampling means 210 and counter means 220 and 230. The sampling means 210 is configured to take said samples from a flow of milk passing through the cell counter unit 130 in the form of an input and output flow $Q_{IN}$ and $Q_{OUT}$ respectively taken from a main milk conduit 158, which in turn, transports milk from the milking machine 110. The counter means 220 and 230 are configured to determine the quality parameter Qcc by registering a true number of somatic cells per unit volume in said samples.

According to one preferred embodiment of the invention, the cell counter unit 130 includes an optical detector means 220 and a cavity 225 having a well-defined volume. The optical detector means 220, in turn, preferably includes at least one lens element and an image sensor (e.g. of CCD or CMOS type), which is configured to register digital image data $D_{img}$ representing the somatic cells in the cavity 225. A processing unit 230 receives the image data $D_{img}$, and based thereon registers the true number of somatic cells in the cavity 225. Since the cavity 225 has a well-defined volume the true number of somatic cells therein provide an accurate measure of the true number of somatic cells per unit volume in the milk extracted from the animal A. This measure can be further enhanced by collecting samples from various phases of the milking procedure, e.g. early, mid and/or late. The sampling means 210 is preferably configured to collect such a set of samples, mix the samples and feed a representative part of the mix into the cavity 225.

Moreover, for improved image quality, the cell counter unit 130 may include a vessel 215 containing a staining fluid and mixing means configured to mix the staining fluid with the milk samples from the sampling means 210, and thus color relevant milk cells such that they are easier to discriminate in the optical detector means 220. It is also advantageous if the cell counter unit 130 includes a light source 223 configured to project light through the cavity 225 and thereby further facilitate the registering of the somatic cells. After processing an amount of fluid in the cavity 225, the cavity 225 is cleaned and a waste container 217 preferably collects the discarded fluid.

Returning now to FIG. 1, the control unit 140 is configured to receive the quality parameter Qcc and in response thereto assign a milk permission interval. The milk permission interval determines an earliest point in time after a completed milking at which point in time the set of milk permission criteria for the animal A are again enabled to be fulfilled. I.e. the animal A cannot be milked until the milk permission interval for this animal A has expired. In addition to the quality parameter Qcc, an expected milk yield is normally also included in a set of milk permission criteria, which determine when a particular animal A should be milked.

According to one preferred embodiment of the invention, the system includes a milking robot 160, configured to automatically attach teat cups to an animal A, which is present within an operation area of the milking machine 110. Thereby, it is made possible for the animals A to autonomously decide when they wish to be milked. Of course, however, as mentioned above, an animal A will only be milked if the set of milk permission criteria are fulfilled for that animal A.

Preferably, the control unit 140 includes, or is associated with, a computer readable medium M, e.g. in the form of a memory module, such that the control unit 140 has access to the contents of this medium M. Furthermore, a program is recorded in the computer readable medium M, and the program is adapted to make a data processor in the control unit 140 control the process described above, as well as the embodiments thereof further elaborated on below, when the program is run on the processor.

According to one preferred embodiment of the invention, the cell counter unit 130 is configured to determine the quality parameter Qcc in connection with completing the milking of an animal A via the milking machine 110, i.e. essentially in real time. However, since it is desirable that samples are taken from different phases of the milking procedure (e.g. early, mid and late) the milking should preferably be completed before determining the quality parameter Qcc.

As mentioned initially, the somatic cell count may vary rather quickly, and thus attain highly dissimilar values at different milkings. Preferably, the control unit 140 is therefore configured to store the received quality parameters Qcc, and based thereon derive a respective historic development of the quality parameters Qcc for each animal A that is milked repeatedly by the milking machine 110.

The control unit 140 then assigns the milk permission interval MP for an animal A based on the historic development for that animal A. This means that the milk permission interval is shortened if the historic development fulfils an increase criterion regarding the number of somatic cells per unit volume, and that the milk permission interval is prolonged if said development fulfils a decrease criterion regarding the number of somatic cells per unit volume. This principle will be further explained below with reference to FIGS. 3a to 3c.

Figure 3A:
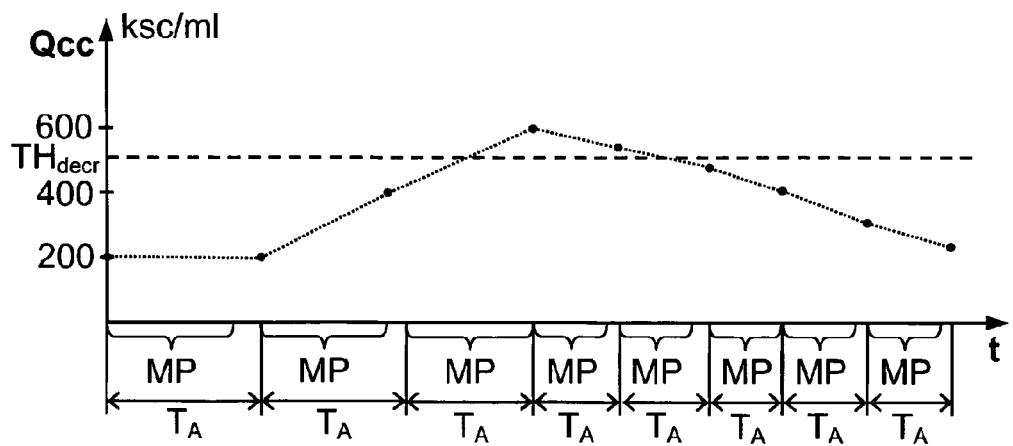
FIGS. 3a-c illustrate how the milk permission interval can be assigned in response to variations in the somatic cell count according to embodiments of the invention.

FIG. 3a shows a diagram illustrating how milk permission intervals MP can be assigned in response to variations in the somatic cell count according to one embodiment of the invention.

In the diagram, the vertical axis expresses the quality parameter Qcc in kilo somatic cells per milliliter of the extracted milk, and the horizontal axis shows time t. The quality parameters Qcc that are determined in connection with each milking are marked with bold points in the diagram, and for illustration purposes, a dotted line connects the bold points. The diagram also shows a first threshold level $TH_{decr}$ representing a concentration of somatic cells, which the quality parameter Qcc should not exceed.

In order to adapt to the fact that the animals A do not always arrive at the milking machine 110 upon expiry of the milk permission interval MP, an actual milking interval $T_A$ is defined according to one preferred embodiment of the invention. The actual milking interval $T_A$ is the period between a latest milking and the milking prior to that milking. Thus, $T_A \geq MP$. It is also worth mentioning that the milk permission interval MP may be expressed in an expected amount of milk in kilograms (rather than an actual period of time), e.g. 10 kg. Moreover, since each animal A has individual milking characteristics, a given expected amount of milk may correspond to different durations in time for different animals. Furthermore, the milking characteristics for an animal A normally varies over time, for instance over the lactation cycle and between different lactations. Therefore, a given expected amount of milk may correspond to different delays between consecutive milkings for a particular animal.

According to the above preferred embodiment of the invention, the control unit 140 is configured to determine a respective interval between consecutive milkings of animals A returning to the milking machine 110, and assign the milk permission interval MP based on the actual interval $T_A$ between a latest milking and the milking prior to that milking. This means that the milk permission interval MP is assigned such that the decrease criterion is mitigated relative to a nominal assumption if the actual interval $T_A$ is longer than a current milk permission interval MP, and the decrease criterion is unchanged relative to the nominal assumption if the actual interval $T_A$ is equal to the current milk permission interval MP. A simple decrease criterion may be represented by a threshold value for an acceptable concentration of somatic cells in the milk. If this decrease criterion is used, mitigation of the criterion typically means increasing the threshold value. The reasoning behind this algorithm is that a somewhat higher somatic cell count value is expected if the animal A arrives relatively late to the milking machine 110, and therefore a slightly higher somatic cell count value can also be tolerated without triggering a reduction of the milk permission interval MP.

In FIG. 3*a*, $T_A$>MP for all milkings except the fourth and the seventh milking. Consequently, the decrease criterion can be mitigated relative to the nominal assumption (e.g. represented by the first threshold level $TH_{decr}$) at the first, second, third, fifth, sixth, eighth and ninth milking.

As can be further seen in FIG. 3, the value of the quality parameter Qcc rises steadily between the second and fourth milkings, and at the fourth milking, the value has passed the first threshold level $TH_{decr}$. In this example, $TH_{decr} \approx 500$ ksc/ml, however any other value is conceivable according to the invention, for instance 700 ksc/ml. In any case, in response to the quality parameter Qcc exceeding the first threshold level $TH_{decr}$, the control unit 140 assigns a shortened milk permission interval MP for the animal A. For example, if the original milk permission interval MP represented an expected amount of 10 kg, the shortened milk permission interval MP may represent an expected amount of 6 kg.

Figure 3B:
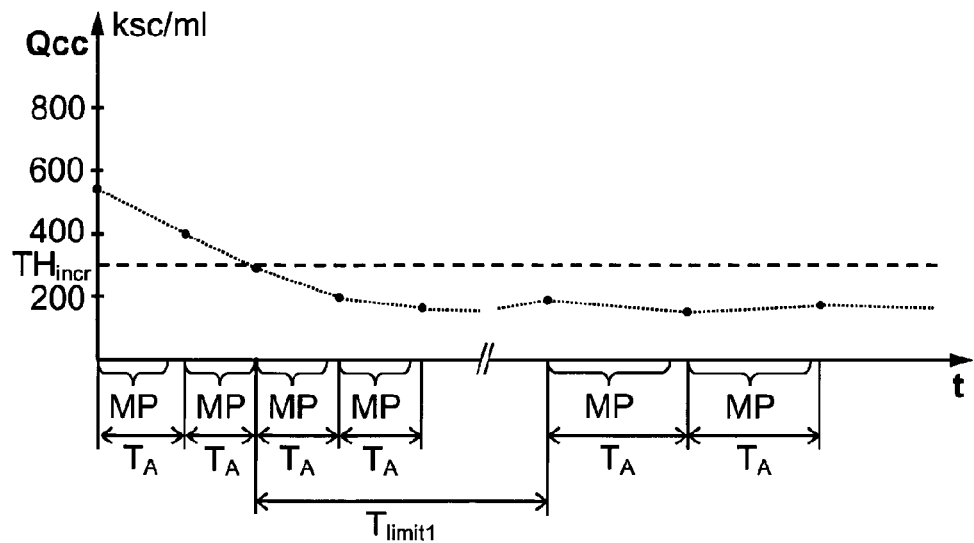

FIG. 3*b* shows another diagram illustrating how milk permission intervals MP can be assigned in response to variations in the somatic cell count according to one embodiment of the invention. Specifically, the diagram in FIG. 3*b* exemplifies a criterion for increasing the milk permission interval MP, which criterion is represented by a second threshold level $TH_{incr}$. Here, $TH_{incr} \approx 300$ ksc/ml, however any other value is conceivable according to the invention. Preferably, the control unit 140 is configured to assign an increased milk permission interval MP if the quality parameter Qcc has remained below second threshold level $TH_{incr}$ during a first predetermined interval $TH_{limit1}$. Naturally, alternative criteria may be applied, for example that after having decreased the milk permission interval MP from a previous value, the control unit 140 re-assigns the original value after having assigned a decreased milk permission interval MP for a predetermined period, say 24 hours.

Figure 3C:
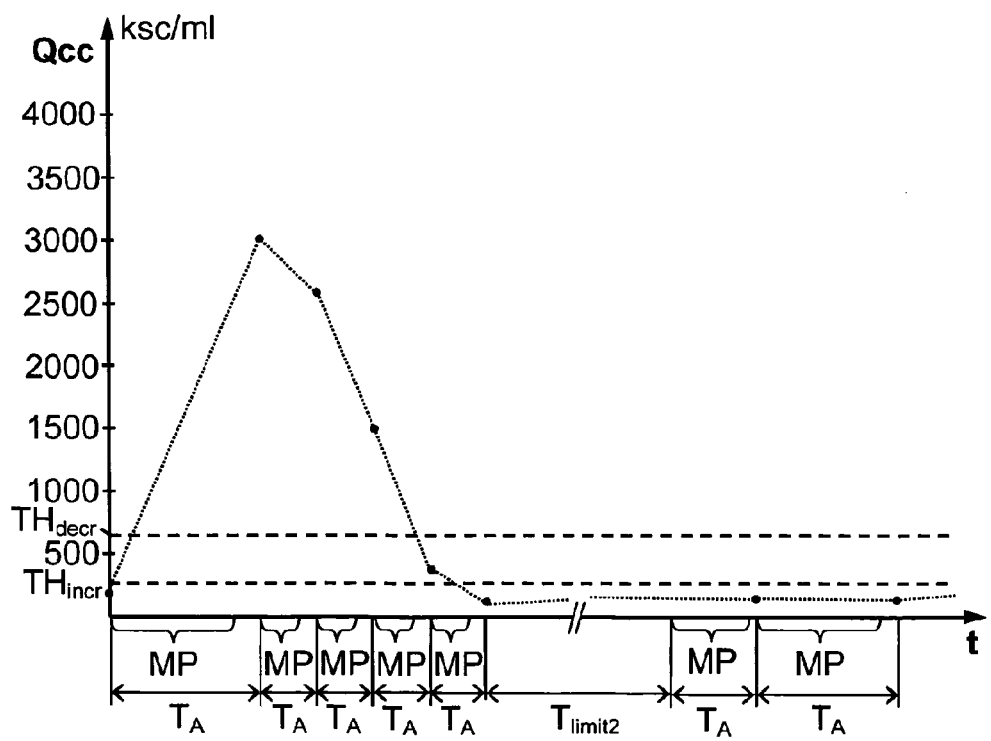

FIG. 3*c* shows a further diagram illustrating how milk permission intervals MP can be assigned in response to variations in the somatic cell count according to one embodiment of the invention. In this example, the quality parameter Qcc increases very rapidly from around 200 ksc/ml to over 3 000 ksc/ml between two consecutive milkings. In such a case, special measures are required, such as a drastic reduction of the milk permission interval MP. If the original milk permission interval MP represented an expected amount of 10 kg, the shortened milk permission interval MP may here represent an expected amount of 4-5 kg. The criteria for re-assigning a longer milk permission interval MP are preferably also stricter. For instance, it can be required that the quality parameter Qcc remains below the second threshold level $TH_{incr}$ during a second predetermined interval $TH_{limit2}$ (where $TH_{limit2}>TH_{limit1}$) before the milk permission interval MP is increased. Preferably, the increase is gradual and extends over a comparatively long period, say 2-4 days.

Besides the above-mentioned criteria, the control unit 140 is preferably configured to assign the milk permission interval MP based on a current lactation cycle for the animal A in question. In particular, this may mean that the decrease criterion is sharpened relative to a nominal assumption if the number of days in milk is below a first threshold value, say 30 days. Alternatively, or additionally, the control unit 140 can be configured to assign the milk permission interval MP, such that the decrease criterion is sharpened relative to the nominal assumption if the number of days in milk is above a second threshold value, say 200 days. Namely, the udder is most sensitive to infections in the beginning and in the end of the lactation cycle, and by this modification of the procedure implemented by the control unit 140 priority is given to the animals in these sensitive phases of the lactation cycle.

In course of the milking process scar tissue is normally formed in the animal's udder. As a result, a somewhat higher number of somatic cells per unit volume can be expected in the milk extracted from an animal A that has experienced relatively many lactation cycles than in the milk from an animal A that has experienced only a few, or none at all, previous lactation cycles. Therefore, according to one preferred embodiment of the invention, the control unit 140 is configured to assign the milk permission interval MP based on the number of lactation cycles completed by the animal A in question. Specifically, the control unit 140 assigns the milk permission interval MP such that the decrease criterion is relatively strict if the animal A has completed a number of lactation cycles below a first threshold number, say 1 or 2; and the decrease criterion is relatively mild if the animal A has completed a number of lactation cycles equal to or above the first threshold number, say 2-4. Here, a relatively mild decrease criterion may mean that a threshold value of the somatic cell count concentration for shortening the milk permission interval MP is comparatively high (say 700 ksc/ml). Similarly, a relatively strict decrease criterion may mean that the threshold value is comparatively low (say 400 ksc/ml).

Returning now once more to FIG. 1, according to one preferred embodiment of the invention, the control unit 140 is configured to assign the milk permission interval MP for an animal A, such that the milk quality parameter Qcc at a given future milking of said animal A is expected to attain a value within a predefined interval. Hence, in practice, the milk permission interval MP can be assigned to such a value that when the animal A is milked next time the number of somatic cells per unit volume can be expected to be below a predefined threshold level. Naturally, depending on the difference between a current value of the milk quality parameter Qcc and the desired future value thereof more than one milking may be required to reach the desired value. Moreover, a gradual adjustment of the milk quality parameter Qcc is conceivable according to the invention, i.e. fine-tuning of the desired future milk quality parameter Qcc on a milking-per-milking basis. In any case, the proposed feedback loop is advantageous from a quality point-of-view.

According to one preferred embodiment of the invention, the system includes a milk tank 150 configured to store milk extracted from a plurality of animals A. The control unit 140 is further configured to assign the milk permission interval MP for an animal A based on a total somatic cell count for an amount of milk currently stored in the milk tank 150 and a quality parameter Qcc for the milk extracted from said animal A. This means that the control unit 140 assigns the milk permission interval MP such that a future milk permission interval MP is allowed to be identical to a currently assigned milk permission interval MP if the milk extracted from said animal A is not expected to cause the total somatic cell count in the milk tank 150 to exceed a predetermined level, for instance representing a minimum quality level. However, the control unit 140 assigns the milk permission interval MP such that a future milk permission interval MP is shortened relative to a currently assigned milk permission interval MP if the milk extracted from said animal A is expected to cause the total somatic cell count in the milk tank 150 to exceed the predetermined level. Thereby, chances are improved that the predetermined level for the total somatic cell count in the milk tank 150 will not be exceeded. It is also advantageous if a milk conduit connecting the milking machine 110 to the milk tank 150 is provided with a valve means 157, which is controllable from the control unit 140 via a third control signal C3. Thereby, any milk that is unsuitable for introduction into the milk tank 150 can instead be diverted into a separate container 155.

According to one preferred embodiment of the invention, prior to assigning a shortened milk permission interval MP, the control unit 140 is configured to investigate whether or not a servicing capacity of the milking machine 110 is estimated to be sufficient to handle the increased milking demand resulting from the thus shortened milk permission interval MP. Namely, the milking machine 110 may already be heavily loaded with milking tasks, and by shortening the milk permission interval MP for an animal A, this animal A will increase the work load on the milking machines 110. Therefore, the control unit 140 is configured to only assign the shortened milk permission interval MP if the milking machine 110 is estimated to have sufficient servicing capacity to handle the increased milking demand proposed in the form of the shortened milk permission interval MP.

Figure 4:
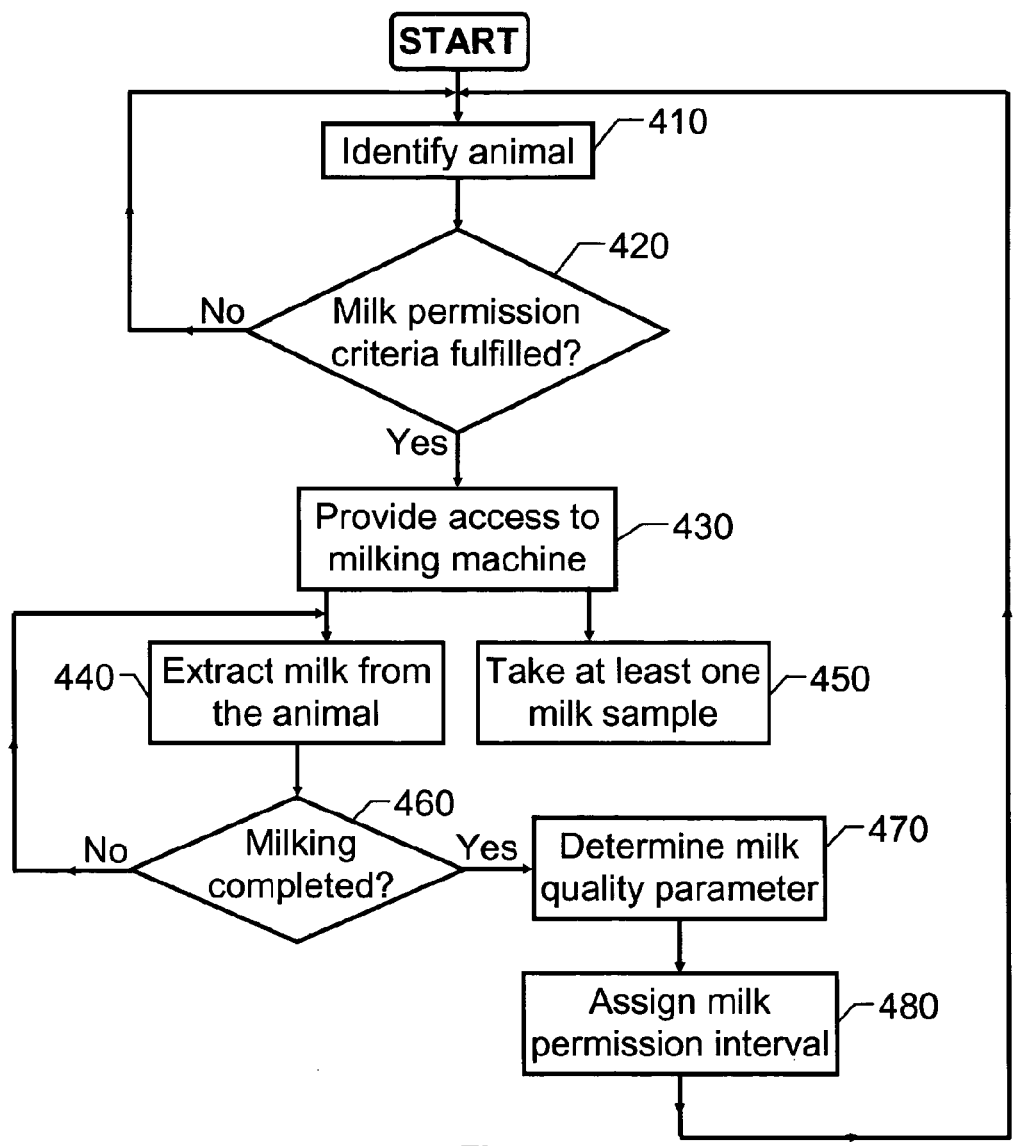
FIG. 4 illustrates, by means of a flow diagram, the general method according to the invention.

In order to sum up, we will now describe the general method according to the invention with reference to the flow diagram in FIG. 4.

We assume that milking animals are repeatedly approaching the milking machine seeking to be milked. Therefore, a first step 410 identifies any animal approaching the milking machine. Thereafter, a step 420 checks whether or not a set of milk permission criteria are fulfilled for the animal, and if these criteria are fulfilled, a step 430 follows. Otherwise, the procedure loops back to step 410.

Step 430 provides access for the animal to the milking machine, and in a subsequent step 440, milk is extracted from the animal via the milking machine. A step 450 parallel to step 440 causes at least one milk sample to be taken from the extracted milk.

A step 460 after step 440 investigates if the milking has been completed, and if so a step 470 follows. Otherwise, the procedure loops back to step 440.

Step 470 determines a milk quality parameter Qcc by registering a true number of somatic cells per unit volume in the at least one sample taken in step 450. In response to the quality parameter Qcc, a step assign a milk permission interval MP determining an earliest point in time after a completed milking at which point in time the set of milk permission criteria for the animal A are again enabled to be fulfilled. Then, the procedure loops back to step 410 again.

All of the process steps, as well as any sub-sequence of steps, described with reference to FIG. 4 above may be controlled by means of a programmed computer apparatus. Moreover, although the embodiments of the invention described above with reference to the drawings comprise computer apparatus and processes performed in computer apparatus, the invention thus also extends to computer programs, particularly computer programs on or in a carrier, adapted for putting the invention into practice. The program may be in the form of source code, object code, a code intermediate source and object code such as in partially compiled form, or in any other form suitable for use in the implementation of the process according to the invention. The program may either be a part of an operating system, or be a separate application. The carrier may be any entity or device capable of carrying the program. For example, the carrier may comprise a storage medium, such as a Flash memory, a ROM (Read Only Memory), for example a DVD (Digital Video/Versatile Disk), a CD (Compact Disc) or a semiconductor ROM, an EPROM (Erasable Programmable Read-Only Memory), an EEPROM (Electrically Erasable Programmable Read-Only Memory), or a magnetic recording medium, for example a floppy disc or hard disc. Further, the carrier may be a transmissible carrier such as an electrical or optical signal which may be conveyed via electrical or optical cable or by radio or by other means. When the program is embodied in a signal which may be conveyed directly by a cable or other device or means, the carrier may be constituted by such cable or device or means. Alternatively, the carrier may be an integrated circuit in which the program is embedded, the integrated circuit being adapted for performing, or for use in the performance of, the relevant processes.

Although the invention is advantageous in connection with cow milking, the invention is equally well adapted for implementation in milking machines for any other kind of mammals, such as goats, sheep or buffaloes.

The term "comprises/comprising" when used in this specification is taken to specify the presence of stated features, integers, steps or components. However, the term does not preclude the presence or addition of one or more additional features, integers, steps or components or groups thereof.

The invention is not restricted to the described embodiments in the figures, but may be varied freely within the scope of the claims.

The invention claimed is:

1. A milking system comprising:
 a milking machine (110) configured to automatically extract milk from a milking animal (A) during a milking procedure;
 an identification arrangement (120) configured to identify an animal (A) and to provide said animal (A) with access to the milking machine (110) only when a set of milk permission criteria are fulfilled for that animal (A);
 a cell counter unit (130) configured to determine a quality parameter (Qcc) reflecting a somatic cell concentration for the milk extracted from said animal (A), the cell counter unit (130) comprising
 i) a sampling unit (210) configured to take a sample of the milk being extracted from said animal (A) during a current milking procedure, and
 ii) a counter unit (220, 230) configured to determine the quality parameter (Qcc) by registering a true number of somatic cells per unit volume in said sample; and
 a control unit (140) configured to receive the quality parameter (Qcc) and in response to the quality parameter (Qcc), assign a milk permission interval (MP) determining an earliest point in time, after the current milking, at which point in time the set of milk permission criteria for said animal (A) are again enabled to be fulfilled.

2. The system according to claim 1, wherein the cell counter unit (130) is configured to determine the quality parameter (Qcc) at the completion of the milking procedure of an animal (A).

3. The system according to claim 1, wherein,
the control unit (140) is configured to
i) store the received quality parameters (Qcc),
ii) based the stored quality parameters (Qcc), derive a respective historic development of the quality parameters (Qcc) for the animal (A) milked repeatedly by the milking machine (110), and
iii) assign the milk permission interval (MP) for the animal (A) based on the historic development for the animal (A), such that
the milk permission interval (MP) is shortened when said development fulfils an increase criterion regarding the number of somatic cells per unit volume, and
the milk permission interval (MP) is prolonged when said development fulfils a decrease criterion regarding the number of somatic cells per unit volume.

4. The system according to claim 3, wherein,
the control unit (140) is configured to i) determine a respective interval between consecutive milkings of the animal (A) returning to the milking machine (110), and ii) assign the milk permission interval (MP) further based on an actual interval (TA) between a latest milking and the milking prior to that milking, such that
the decrease criterion is mitigated relative to a nominal assumption when the actual interval (TA) is longer than a current milk permission interval (MP), and
the decrease criterion is unchanged relative to the nominal assumption when the actual interval (TA) is equal to the current milk permission interval (MP).

5. The system according to claim 3, wherein the control unit (140) is configured to assign the milk permission interval (MP) based on a current lactation cycle for the animal (A), such that the decrease criterion is sharpened relative to a nominal assumption when the number of days in milk is below a first threshold value.

6. The system according to claim 3, wherein the control unit (140) is configured to assign the milk permission interval (MP) based on a current lactation cycle for the animal (A), such that the decrease criterion is sharpened relative to a nominal assumption when the number of days in milk is above a second threshold value.

7. The system according to claim 3, wherein the control unit (140) is configured to assign the milk permission interval (MP) based on a number of lactation cycles completed by the animal (A), such that the decrease criterion is relatively strict when the animal (A) has completed a number of lactation cycles below a first threshold number.

8. The system according to claim 7, wherein the control unit (140) is configured to assign the milk permission interval (MP) based on the number of lactation cycles completed by the animal (A), such that the decrease criterion is relatively mild when the animal (A) has completed a number of lactation cycles equal to or above the first threshold number.

9. The system according to claim 1, further comprising:
a milk tank (150) configured to store milk extracted from a plurality of animals (A), and
wherein the control unit (140) is configured to assign the milk permission interval (MP) for the animal (A) based on i) a total somatic cell count for an amount of milk currently stored in the milk tank (150) and ii) the quality parameter (Qcc) for the milk extracted from said animal (A), such that
a future milk permission interval (MP) is allowed to be identical to a currently assigned milk permission interval (MP) when the milk extracted from the animal (A) is not expected to cause the total somatic cell count in the milk tank (150) to exceed a predetermined level, and
a future milk permission interval (MP) is shortened relative to a currently assigned milk permission interval (MP) when the milk extracted from the animal (A) is expected to cause the total somatic cell count in the milk tank (150) to exceed the predetermined level.

10. The system according to claim 9, wherein prior to assigning a shortened milk permission interval (MP) the control unit (140) is configured to investigate whether or not a servicing capacity of the milking machine (110) is estimated to be sufficient to handle an increased milking demand resulting from the thus shortened milk permission interval (MP), and only assign the shortened milk permission interval (MP) when the servicing capacity of the milking machine (110) is estimated to be capable of handling the increased milking demand.

11. The system according to claim 1, wherein the cell counter unit (130) comprises an optical detector unit (220) configured to register the true number of somatic cells in a cavity (225) having a defined volume.

12. The system according to claim 1, wherein the control unit (140) is configured to assign the milk permission interval (MP) for the animal (A) such that the milk quality parameter (Qcc) at a given future milking of the animal (A) is expected to attain a value within a predefined interval.

13. The system according to claim 1, further comprising:
a milking robot (160) configured to automatically attach teat cups to an animal (A) present within an operation area of the milking machine (110).

14. A computer readable medium (M) having a non-transitory program recorded thereon, where the program when loaded into a computer, causes the computer to function to:
identify an animal (A);
provide access for the animal (A) to the milking machine (110) only when a set of milk permission criteria are fulfilled for the animal (A);
control the milking machine (110) to automatically extract milk from a milking animal (A) present at the milking machine (110);
control a cell counter unit (130) to take at least one sample from the milk that is extracted from the animal (A),
determine a milk quality parameter (Qcc) by registering a true number of somatic cells per unit volume in said at least one sample, and in response to the quality parameter (Qcc) assign a milk permission interval (MP) determining an earliest point in time after a currently completed milking procedure at which point in time the set of milk permission criteria for the animal (A) are again enabled to be fulfilled.

15. A milking system, comprising:
a milking machine (110) configured to automatically extract milk from a milking animal (A) during a milking procedure;
an identification arrangement (120) configured to identify an animal (A) and to provide said animal (A) with access to the milking machine (110) only when a set of milk permission criteria are fulfilled for that animal (A);
a cell counter unit (130) configured to determine a quality parameter (Qcc) reflecting a somatic cell concentration for the milk extracted from said animal (A), the cell counter unit (130) comprising
i) a sampling unit (210) configured to take plural samples of the milk being extracted from said animal (A), each sample of the milk taken at a different phase of the milking from a beginning of the milking procedure through an end of the milking procedure, the plural samples being combined into a combined sample representative of the milk having been extracted from said sample, and
ii) a counter unit (220, 230) configured to determine the quality parameter (Qcc) by registering a true number of somatic cells per unit volume in said combined sample the cell counter unit (130) at the completion of the milking procedure of an animal (A); and a control unit (140) configured to i) receive the quality parameter (Qcc), ii) determine an actual milking interval ($T_A$) between a latest milking procedure and an immediately prior milking procedure, and iii) in response to the quality parameter (Qcc) and the actual milking interval ($T_A$), in real time assign a milk permission interval (MP) determining an earliest point in time after the latest milking procedure at which point in time the set of milk permission criteria for said animal (A) are again enabled to be fulfilled.

16. The system according to claim 15, wherein,
the control unit (140) is configured to
i) store the received quality parameters (Qcc) for the animal at each milking procedure, and
ii) based the stored quality parameters (Qcc), derive a respective historic development of the quality parameters (Qcc) for the animal (A), and
iii) assign the milk permission interval (MP) for the animal (A) based on the historic development for the animal (A), such that
the milk permission interval (MP) is shortened when said development fulfills an increase criterion regarding the number of somatic cells per unit volume, and
the milk permission interval (MP) is prolonged when said development fulfills a decrease criterion regarding the number of somatic cells per unit volume,
iv) to assign the milk permission interval (MP) based on an actual interval (TA), such that
the decrease criterion is mitigated relative to a nominal assumption when the actual interval (TA) is longer than a current milk permission interval (MP), and
the decrease criterion is unchanged relative to the nominal assumption when the actual interval (TA) is equal to the current milk permission interval (MP).

17. The system according to claim 15, further comprising:
a milk tank (150) configured to store milk extracted from a plurality of animals (A), and
wherein the control unit (140) is configured to assign the milk permission interval (MP) for the animal (A) based on i) a total somatic cell count for an amount of milk currently stored in the milk tank (150) and ii) the quality parameter (Qcc) for the milk extracted from said animal (A), such that
a future milk permission interval (MP) is allowed to be identical to a currently assigned milk permission interval (MP) when the milk extracted from the animal (A) is not expected to cause the total somatic cell count in the milk tank (150) to exceed a predetermined level, and
a future milk permission interval (MP) is shortened relative to a currently assigned milk permission interval (MP) when the milk extracted from the animal (A) is expected to cause the total somatic cell count in the milk tank (150) to exceed the predetermined level.

18. The system according to claim 15, wherein prior to assigning a shortened milk permission interval (MP) the control unit (140) is configured to investigate whether or not a servicing capacity of the milking machine (110) is estimated to be sufficient to handle an increased milking demand resulting from the thus shortened milk permission interval (MP), and only assign the shortened milk permission interval (MP) when the servicing capacity of the milking machine (110) is estimated to be capable of handling the increased milking demand.

19. The system according to claim 15, wherein the control unit (140) is configured to assign the milk permission interval (MP) for the animal (A) such that the milk quality parameter (Qcc) at a given future milking of the animal (A) is expected to attain a value within a predefined interval.

* * * * *